(No Model.)
H. A. HUGHES.
PROCESS OF CUTTING SUGAR AND SORGHUM CANE.
No. 354,905. Patented Dec. 28, 1886.
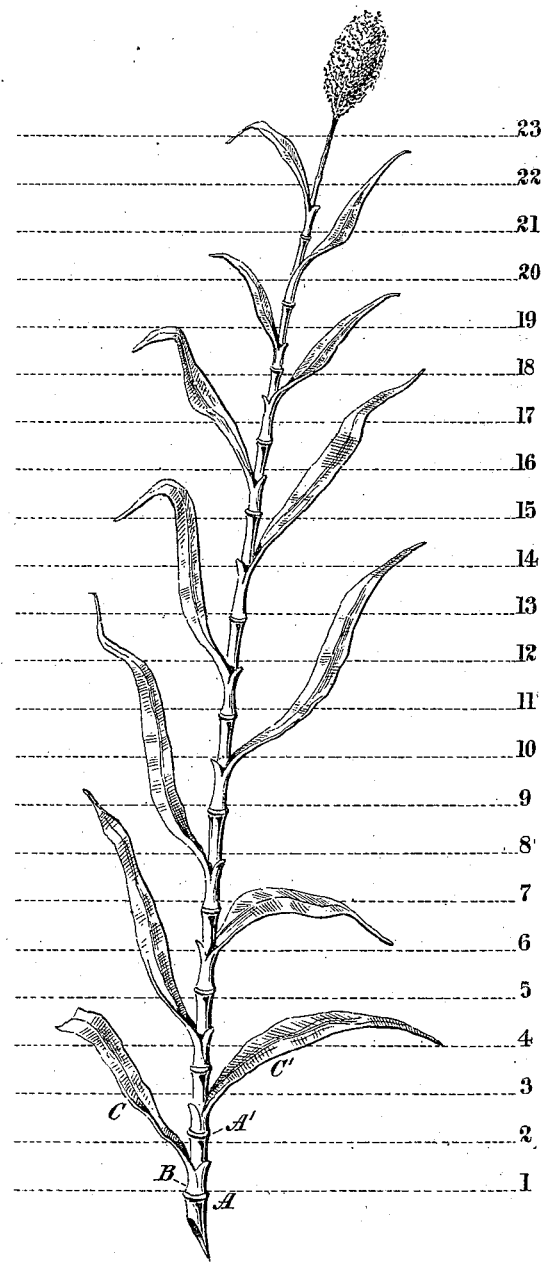

UNITED STATES PATENT OFFICE.

HENRY A. HUGHES, OF RIO GRANDE, NEW JERSEY.

PROCESS FOR CUTTING SUGAR AND SORGHUM CANE.

SPECIFICATION forming part of Letters Patent No. 354,905, dated December 28, 1886.

Application filed February 6, 1886. Serial No. 191,106. (No specimens.)

*To all whom it may concern:*

Be it known that I, HENRY A. HUGHES, of Rio Grande, Cape May county, New Jersey, have invented a new and useful Process for Cutting Sugar and Sorghum Cane, of which the following is a specification.

I have determined by experiment that a comparison of the diffusion products from stripped and unstripped cane indicates that the financial success of the sorghum-sugar industry largely depends upon the removal of the leaves and leaf-sheaths from the cane prior to subjecting the latter to the diffusion process—this, first, because the presence of the leaves and leaf-sheaths in the diffusers increases the amount of water to be evaporated by thirty-three per cent., and, second, because they impart to diffusion-juices a very dark color and intensely bitter taste, the effect of which is to reduce the market value of sirups at least one-half. I have, in fact, found that ripe cane carefully stripped and topped can be digested for hours in water kept near its boiling-point and will then yield a solution even freer from disagreeable taste and color than mill-juice.

The removal of the leaves and sheaths from the cane involves considerable labor and expense, which necessarily adds to the cost of manufacture, and as the cane is at present prepared the stripping and cutting are successive and separate processes. I have found that it is possible to cut the cane into short pieces in such a way as at the same time to free the pieces in some instances entirely from leaves and sheaths, and in others to leave the latter attached in very short lengths, so that they can easily be removed.

My invention relates to my new process of cutting or subdividing the cane so as simultaneously to free the same to a large extent of its leaves and sheaths.

The accompanying drawing shows a typical stalk of sorghum-cane.

The stalk or stem is made up of a series of sections separated by joints or knots A. Above each knot rises a sheath, B, which surrounds the stem, and from these sheaths extend the leaves. The sheaths are attached at and above the knots.

The dotted lines in the drawing show transverse cuts made in accordance with my process, and an examination of a few of the pieces of cane thus divided will indicate clearly the principle upon which my said process is based.

Considering first the section of stalk between dotted lines 1 and 2, it will be apparent that the cut indicated by 1 comes just over the lowest knot or joint A, while the upper cut, 2, is below the knot or joint A'. Cut 1 will therefore pass through the sheath B above its place of attachment at the knot A, and this sheath will therefore be left loose on the stem. Cut 2 will not only divide the stem, but, as is apparent by following the dotted line to the left, will remove the larger portion of the leaf C. The consequence will be that the section of cane included between the cuts 1 and 2 will have simply a portion of the loose sheath upon it, which may be easily removed, and often will disengage itself.

Referring next to the section of stalk included between cuts 2 and 3, cut 3 will remove a large portion of the leaf C'; but as cut 2 is below the joint or knot A', a short portion of the sheath will remain attached to the section. In the case of cuts 14 and 15, cut 15 comes directly under a knot and cut 14 just at the top of a sheath. The result here is that the piece of cane is divided out clear of both leaf and sheath.

As represented in the drawing, the cane is divided into twenty-two sections or pieces, and if we analyze the conditions of each piece in the manner above indicated we shall find that seven of the twenty-two pieces will be obtained clear of leaf and sheath, eight pieces will be encircled by the sheath, which, however, will not be attached, and will therefore easily come off, and seven pieces will have the sheath attached. Out of the total length of cane, therefore, only about thirty-three per cent. actually requires stripping by machine.

In the drawing the cuts are shown as so spaced as to be at equal intervals apart. This, however, is not necessary. So also the formation of the cane in the drawing is merely typical, no two stalks in nature being exactly alike. The principle of my process is, however, this: to divide the stalk of the cane so that each section or piece shall not contain more than one knot or joint, as A or A'. It is not requisite that each piece should contain one joint, because, obviously, in cases where the joints are far apart two or more pieces may be cut from the same section (space between adjacent joints) of the stem, neither piece containing a knot. This will occur very often with sorghum, where the joints are frequently some eleven inches apart. In sugar-cane the joints are much closer together. It is essential, however, that no piece or section should contain more joints than one. By following this the maximum percentage of clear cane is obtained by the simple operation of cutting the stalk, and the minimum quantity of sheaths is left attached, requiring subsequent stripping by machine.

I claim as my invention—

The process of cutting sorghum or sugar cane into short sections preparatory to diffusion and of simultaneously removing the leaves and sheaths from the maximum proportion of said sections, which consists in dividing the stalk by cross-cuts so disposed that each division or section of the said stalk shall not contain more than one knot or joint, substantially as described.

HENRY A. HUGHES.

Witnesses:
GEO. C. POTTS,
R. G. W. DENISON.